(12) United States Patent
Befu et al.

(10) Patent No.: US 7,068,837 B2
(45) Date of Patent: Jun. 27, 2006

(54) IMAGE PROCESSING METHOD

(75) Inventors: Shinobu Befu, Kita-Soma-gun (JP); Yoshinori Arai, Tokyo (JP); Hitoshi Tsunashima, Chiba (JP); Masakazu Suzuki, Kyoto (JP)

(73) Assignees: Nihon University, Tokyo (JP); J. Morita Manufacturing Corporation, Kyoto (JP)

( * ) Notice: Subject to any disclaimer, the term of this patent is extended or adjusted under 35 U.S.C. 154(b) by 679 days.

(21) Appl. No.: 10/181,783

(22) PCT Filed: Nov. 22, 2001

(86) PCT No.: PCT/JP01/10211

§ 371 (c)(1),
(2), (4) Date: Jul. 22, 2002

(87) PCT Pub. No.: WO02/43001

PCT Pub. Date: May 30, 2002

(65) Prior Publication Data

US 2003/0002724 A1    Jan. 2, 2003

(30) Foreign Application Priority Data

Nov. 24, 2000   (JP) .............................. 2000-358420

(51) Int. Cl.
*G06K 9/00* (2006.01)
*H04N 5/14* (2006.01)
(52) U.S. Cl. ...................... 382/154; 382/169; 348/671
(58) Field of Classification Search ................ 382/100, 382/151, 209, 181, 232, 237, 176, 173, 205, 382/228, 264, 254, 270, 276, 154, 169; 348/673, 348/671, 672
See application file for complete search history.

(56) References Cited

U.S. PATENT DOCUMENTS

| 4,847,881 | A | * | 7/1989 | Heubeck ...................... 378/38 |
| 4,891,829 | A | * | 1/1990 | Deckman et al. .............. 378/4 |
| 5,793,375 | A | * | 8/1998 | Tanaka ........................ 345/426 |
| 6,434,214 | B1 | * | 8/2002 | Kawai et al. .................. 378/4 |

FOREIGN PATENT DOCUMENTS

JP     62-129035     6/1987

(Continued)

OTHER PUBLICATIONS

Tsugunobu Beppu et al.: "Ortho-CT wo mochiiita ago kansetsu no 3-jigen model kouchiku ni kansuru kenkyu" Denshi Joho Tsuushin Gakkai Gijutsu Kenkyu Houkoku, vol. 100, No. 596, pp. 145-149, Jan. 18, 2001.

(Continued)

*Primary Examiner*—Kanjibhai Patel
*Assistant Examiner*—Sheela Chawan
(74) *Attorney, Agent, or Firm*—Oblon, Spivak, McClelland, Maier & Neustadt, P.C.

(57) ABSTRACT

An image processing method comprises an extracting step for extracting a plurality of images of different depths of a 3-dimensional object, the axes forming different angles with the 3-dimensional object, a binary coding step for eliminating a gray level range of the plurality of images obtained by the extracting step, the gray level range containing a small amount of components of the 3-dimensional object, remapping the other portion to a predetermined gray level value range, and putting the plurality of images in binary form, and a step for forming a 3-dimensional image of the 3-dimensional object based on the plurality of images put in binary form by the binary coding step.

9 Claims, 20 Drawing Sheets

FOREIGN PATENT DOCUMENTS

| | | |
|---|---|---|
| JP | 1-88783 | 4/1989 |
| JP | 1-88786 | 4/1989 |
| JP | 1-88787 | 4/1989 |
| JP | 3-121579 | 5/1991 |
| JP | 7-14023 | 1/1995 |
| JP | 2000-30044 | 1/2000 |

OTHER PUBLICATIONS

Y. Arai et al.: "Development of ortho cubic super high resolution CT (Ortho-CT)" CAR'98, pp. 780-785 1998.

Y. Arai et al.: "Development of the three dimensional image display program for limited cone beam x-ray CT for dental use (Ortho-CT)" Dental Radiology, vol. 39, No. 4, pp. 224-229 2000.

T. Agui et al. "Introduction to image processing by C language" SHOKO-DO 2000, section 1.2, pp. 4-8.

John Canny: "A computational approach to edge detection" IEEE Transactions on Pattern Analysis and Machine Intelligence, vol. PAMI-8, No. 6, pp. 679-698 Nov. 1986.

* cited by examiner

IMAGE PROCESSING METHOD

TECHNICAL FIELD

The invention relates to an image processing method and particularly to an image processing method to process 3-dimensional images.

BACKGROUND ART

Recently, with development of a computer technique that is applied to the medical field, the diagnosis of a human body and structural analysis are commonly performed based on 3-dimensional data obtained by CT and MRI. Additionally, in the field of dentistry, a 3-dimensional imaging technique is used for a study to form a 3-dimensional model of the temporomandibular joint from data filmed by CT, for example, Yoshinori Arai, Koji Hashimoto, Hiroshi Shinoda, "Development in 3D imaging program for small field-sized X-ray computed tomography (an Ortho-CT image) for dentistry use", Dentistry Radioactive Rays, 39 "4" P224–P229, 2000.

However, there still remain lots of things in which the operator is involved to process the CT image in the conventional study. Therefore, it is desired that a system can semi-automatically create, based on the data obtained by CT, a 3-dimensional model that the operator can process afterward.

Additionally, a CT image of the temporomandibular joint requires a plurality of transmitted images or reflective images taken by applying radiation to a body. The amount of radiation applied to the body must be minimized so as to not expose the body to excessive radiation.

However, the CT image obtained by weak radiation is noisy. In the case of a CT apparatus for the temporomandibular joint, the amount of X-ray radiation is limited to about $1/100$ of that of a conventional CT apparatus for general medical use. The 3-dimensional image obtained by such a weak X-ray radiation sometimes is partially not clear enough for dental use.

DISCLOSURE OF INVENTION

Accordingly, it is a general object of the present invention to provide a novel and useful image processing method in which one or more of the problems described above are eliminated.

Another and more specific object of the present invention is to provide a high speed image processing method to create a low noise image even using weak radiation.

To achieve this object, the present invention is configured to form a 3-dimensional image of a 3-dimensional object by an extracting step for extracting a plurality of images of a 3-dimensional object along one or more axes at different depths, said axes forming different angles with said 3-dimensional object, a binary coding step for eliminating a gray level range containing small components of said object, remapping the other portion of the gray level range to a predetermined gray level value range, and putting the plurality of images in binary form, and a step for forming a 3-dimensional image of said 3-dimensional object based on the plurality of images put in binary form by said binary coding step.

To achieve this object, another configuration of the present invention is configured to form a 3-dimensional image of a 3-dimensional object by an extracting step for extracting, from a 3-dimensional object, a plurality of images along a plurality of axes, wherein each axis is in a different direction and each image is at a different depth on an axis, a binary coding step for eliminating a gray level range containing small components of said object, remapping the other portion of the gray level range to a predetermined gray level value range, and putting the plurality of images in binary form, and a step for forming a 3-dimensional image of said 3-dimensional object based on the plurality of images put in binary form by said binary coding step.

The present invention, configured as described above, can provide an image processing method with which low noise images are obtained by high speed processing even with a small amount of radiation, and one can surely obtain an image of the 3-dimensional object even if a gray level range containing a small amount of the 3-dimensional object components is eliminated, since a plurality of images of different depths of the 3-dimensional object are extracted for a plurality of angles and many images are obtained. Images with small influence of noise are also obtainable since noise components can be diffused by eliminating a gray level range containing a small amount of the 3-dimensional object components, remapping the other portion to a predetermined gray level range, and binary coding.

In order to reduce the noise component without damaging the accuracy of the image, the present invention can be configured to include a step for extracting averaged images from the average of a predetermined number of images consecutive in the depth direction, or the present invention can be configured to include a step of extracting images by averaging a predetermined number of images, each averaging performed on a predetermined number of images shifted by one image.

Further, in order to perform faster processing, the present invention can be configured to include a step for averaging one image for every plurality of images and performing extraction.

In addition, the degrading of accuracy is negligible since the present invention uses a great number of images even when configured as described above.

Furthermore, in order to reduce the noise component and extract the image of the 3-dimensional object for sure, the present invention can be configured to include a step for binary coding after remapping a gray level value range, in which noise component is negligible, in the original gray level distribution containing a great amount of noise components in the histogram of gray level of the 3-dimensional object.

Furthermore, in order to surely extract an image containing the components of the 3-dimensional object from the image containing the background components or the imaging object component, the present invention can be configured to include a step for performing remapping depending on a peak gray level, multiplied by a predetermined coefficient, in a gray level range containing a great amount of the background components or a peak gray level, multiplied by a predetermined coefficient, in a gray level range containing a great amount of the 3-dimensional object and for binary coding.

Furthermore, in order to obtain the most suitable image in consideration of gray level distribution of the peripheral pixels, the present invention can be configured to include a step for statistically performing the remapping based on the gray level distribution of peripheral pixels and binary coding.

BRIEF DESCRIPTION OF DRAWINGS

Other objects, features, and advantages of the present invention will become more apparent from the following detailed description when read in conjunction with the accompanying drawings.

Main reference marks used in the above figures are explained as follows.

1 is a system; 11 is a radiation source; 12 is a detector; 13 is an analog-to-digital converter; 14 is a general purpose computer; and 21 is an imaged 3-dimensional object.

BEST MODE FOR CARRYING OUT THE INVENTION

A description of the preferred embodiment of the present invention will be given below.

THE FIRST EMBODIMENT

This embodiment is the case such that 2-dimensional image data of the 3-dimensional object are extracted from 3-dimensional data obtained by an Ortho-CT apparatus.

Figure 1:
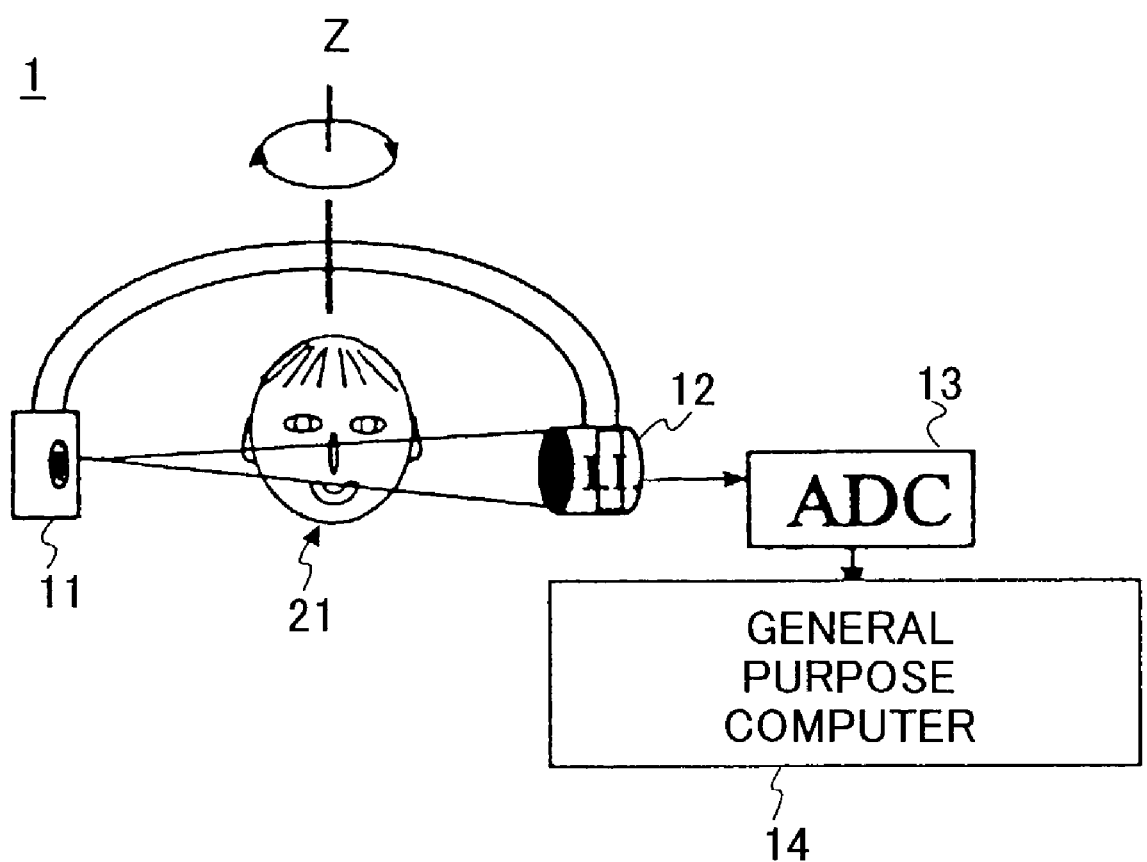
FIG. 1 is schematic block diagram of an imaging apparatus (an Ortho-CT).

FIG. 1 is a block diagram showing an Ortho-CT apparatus.

Imaging apparatus 1 is an Ortho-CT apparatus configured by a radiation source 11, detector 12, analog-to-digital converter 13, and a general purpose computer 14. Radiation source 11 emits radiation, and the radiation emitted by radiation source 11 irradiates the 3-dimensional object 21. The radiation is transmitted through the 3-dimensional object 21 and is incident on detector 12. Detector 12 outputs detection signals in response to the strength of the incident radiation.

In addition, general purpose computer 14 may perform image processing by installing and running an image processing program stored in recording media such as HDD, CD-ROM, CD-R, and FDD.

Additionally, general purpose computer 14 may operate as the analog-to-digital converter 13 by running a software program. In this case, a separate analog-to-digital converter 13 may not be required.

Radiation source 11 and detector 12 are positioned facing each other with the 3-dimensional object 21 in between, and can rotate around the Z-axis at least 180 degrees. The (analog) signal detected by detector 12 is provided to analog-to-digital converter 13, and converted into digital data. The data that are converted by analog-to-digital converter 13 are provided to general purpose computer 14 for image processing. The 3-dimensional data of the 3-dimensional object 21 are obtained in this manner. As showed in FIG. 2, the 3-dimensional projection data obtained by the Ortho-CT has a cylinder shaped imaging region of 240*300*300 pixels.

In the image processing according to this embodiment, 3-dimensional data are first converted into 2-dimensional data, and then converted again into 3-dimensional data so that the image processing becomes simple. In other words, general purpose computer 14 extracts a 2-dimensional image from cylinder-shaped 3-dimensional data directly provided by an Ortho-CT. General purpose computer 14 processes the 2-dimensional image, the details of which will be described later, to obtain binary images with reduced noise and converts the binary images into 3-dimensional data again.

An Ortho-CT is described in detail in "Development of Ortho Cubic Super High Resolution CT (Ortho-CT)", Car '98, P780–P785 (proc.), 1998, written by Arai Y, Tammisalo E, Iwai K, et al.

Next, the method for extracting 2-dimensional images from 3-dimensional data directly provided by an Ortho-CT will be described.

Figure 2:
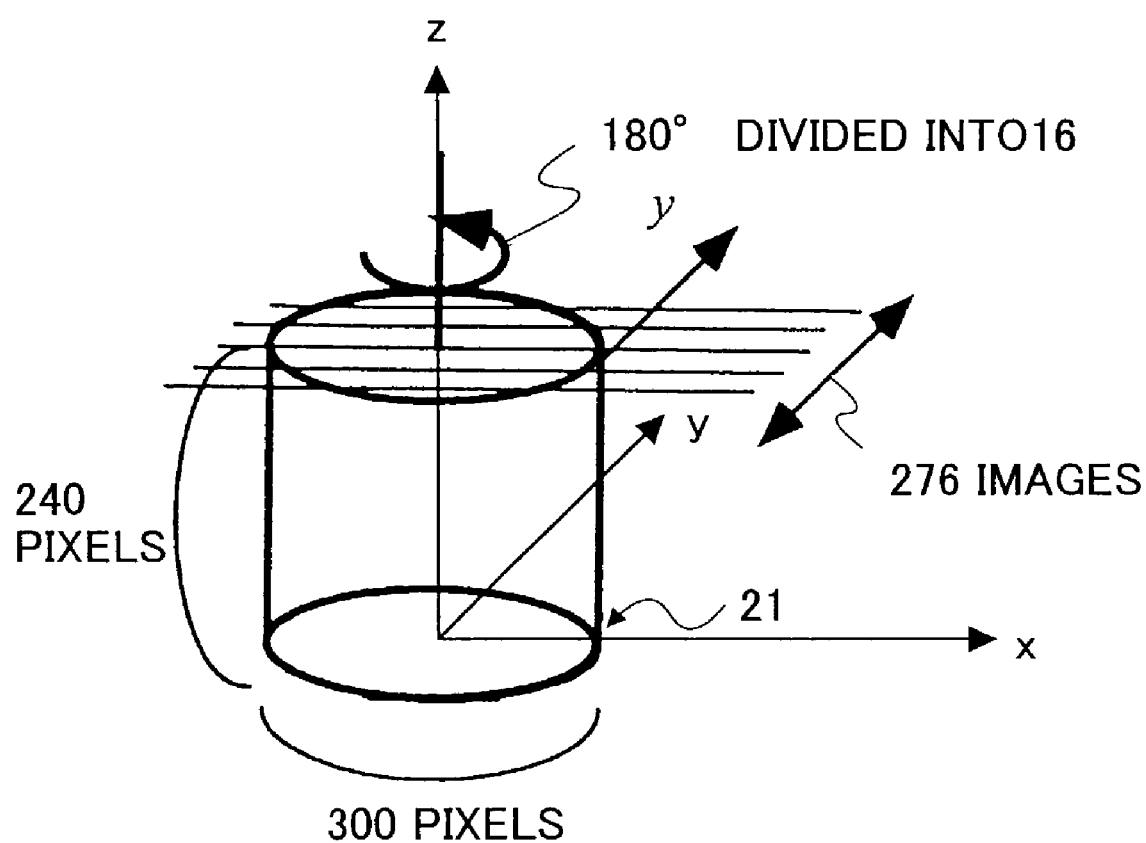
FIG. 2 is a schematic diagram for explaining a method of image extraction.

FIG. 2 is a figure convenient for explaining the image extraction method according to an embodiment of the present invention.

Three dimensional data are obtained by taking images of the temporomandibular joint with the Ortho-CT showed in FIG. 1. Two-dimensional images are obtained (extracted) from the 3-dimensional data. In order to get a temporomandibular joint image with a relatively clear outline, 4,416 images (276 images×16 directions), for example, are taken. In other words, as shown in FIG. 2, 276 images of 300 pixels wide×240 pixels long, each having different depth in a direction, are taken for 16 directions. In addition, each pixel of extracted image data is expressed in 8 bits, 256 steps of gray scale, for example.

Figure 3:
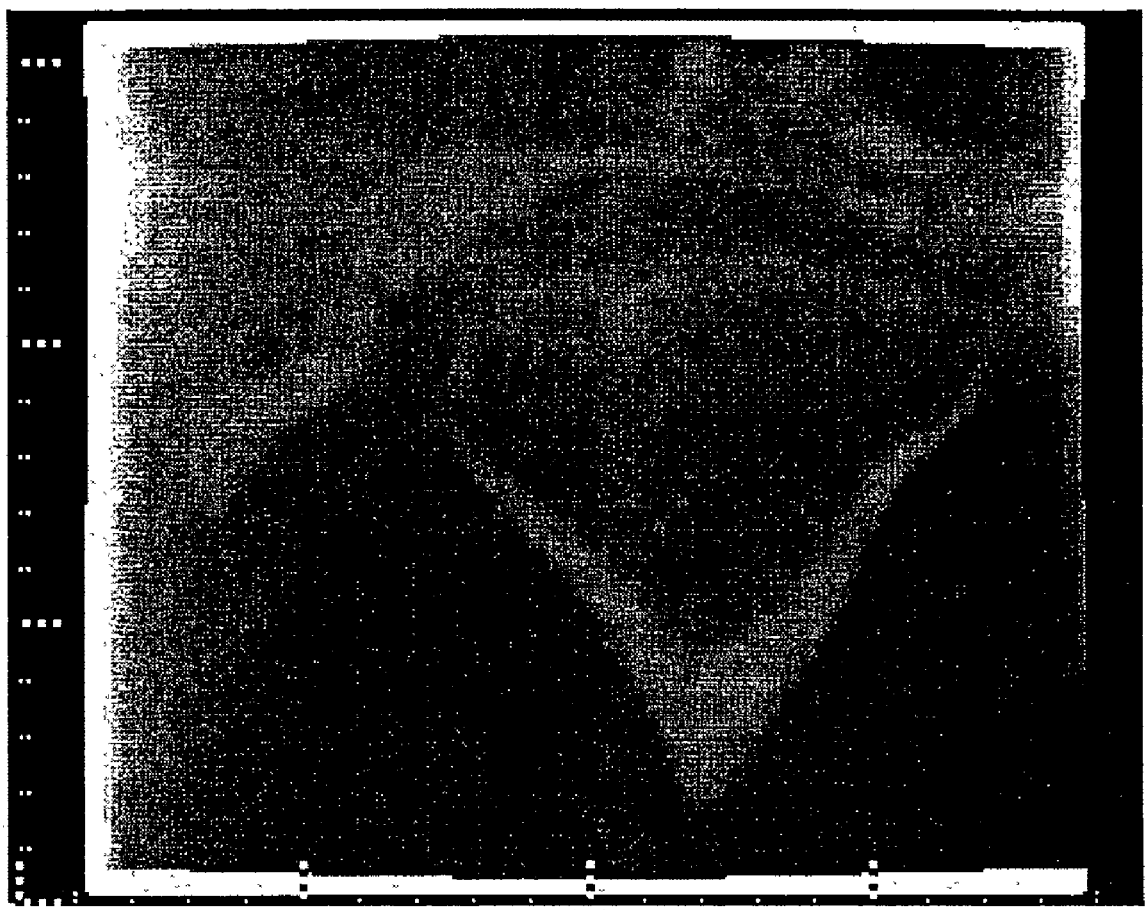
FIG. 3 is a photograph that shows an original picture image of a temporomandibular joint.

FIG. 3 is an original image of a temporomandibular joint extracted as showed in FIG. 2. The original image showed in FIG. 3 is noisy since image processing has not been performed yet.

General purpose computer 14 extracts the 2-dimensional images from the 3-dimensional data detected by detector 12 as described above, and stores the 2-dimensional images in internal memory. Image processing of the present embodiment is performed using 276 two-dimensional images stored in internal memory.

A detailed description of the image processing according to the present embodiment will be given below.

Figure 4:
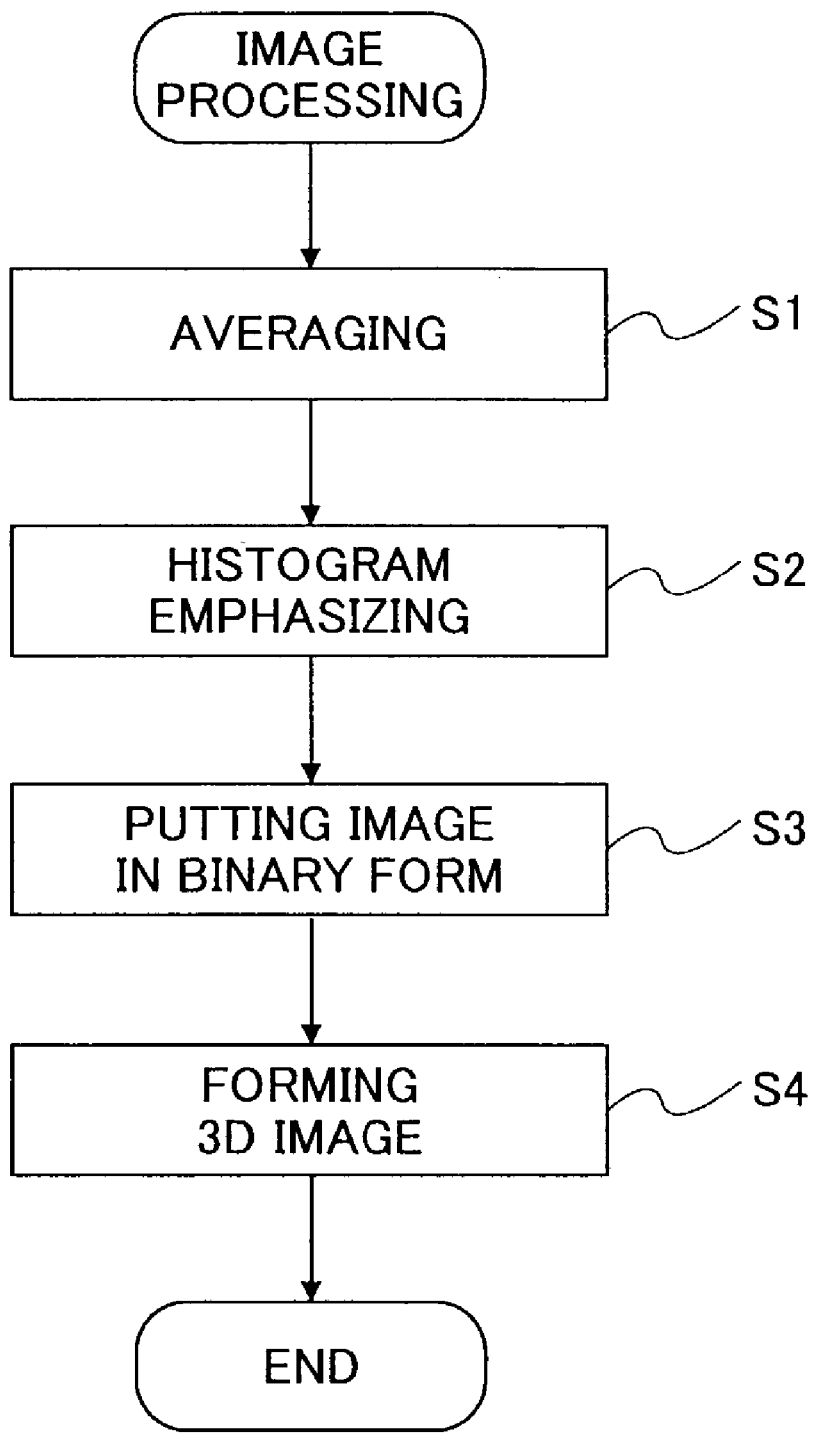
FIG. 4 is a flow diagram of image processing according to the first embodiment.

FIG. 4 is a flow diagram showing the image processing according to the first embodiment of the present invention.

Image processing of the first embodiment includes steps S1 through S4. Step S1 is a step for averaging a plurality of images in order to reduce noise. Step S2 is a step for appropriately remapping the plurality of images that were averaged in Step S2. In step S2, one may use a histogram emphasis method, for example. Step S3 is a step for binary coding an image mapped in step S2. Step S4 is a step for forming a 3-dimensional image of the imaging object based on the image binary coded in step S2.

By the way, a clear 2-dimensional image having low noise is available in step S3 since the image data are processed in steps S1 and S2 prior to step S3. Therefore, one may regard steps S1 and S2 as preparatory steps of step S3 included therein.

Figure 5:
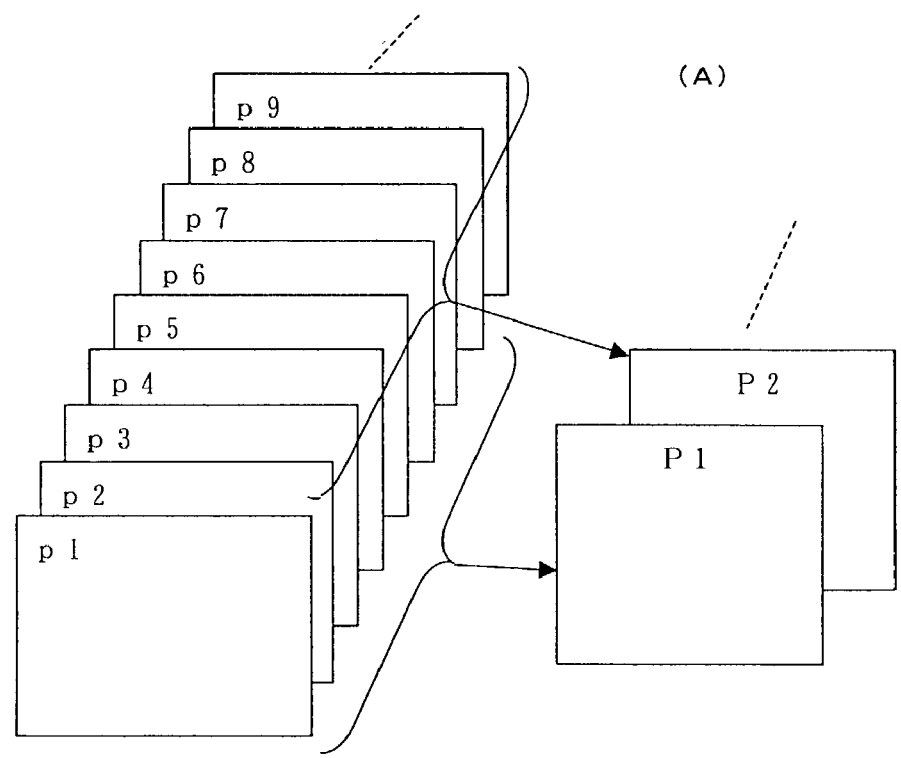
FIG. 5 is a schematic diagram for explaining the averaging process according to the present invention.
Figure 5:
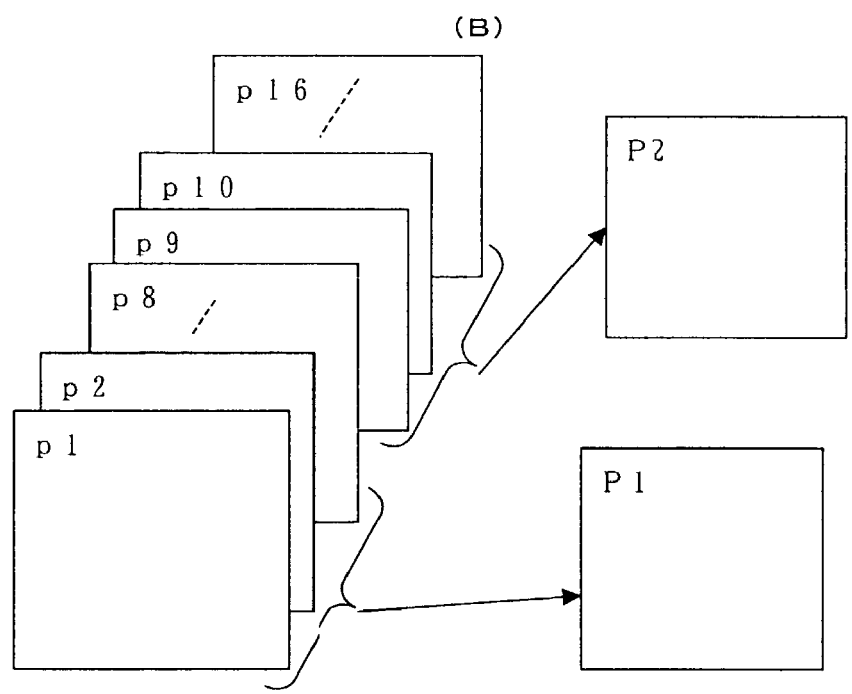

Averaging processing in step S1 will be described first. FIG. 5 is a figure convenient for explaining the operation of averaging processing according to the embodiment of the present invention.

As showed in FIG. 5(A), the averaging processing forms one 2-dimensional image by averaging every eight 2-dimensional images, for example, each pixel of the one 2-dimensional image being the average of corresponding pixels of the eight 2-dimensional images. For example, the first screen P1 is the average of eight screens p1–p8; the second screen P2 is the average of eight screens p2–p9; and the third screen P3 is the average of eight screens p3–p10.

Figure 6:
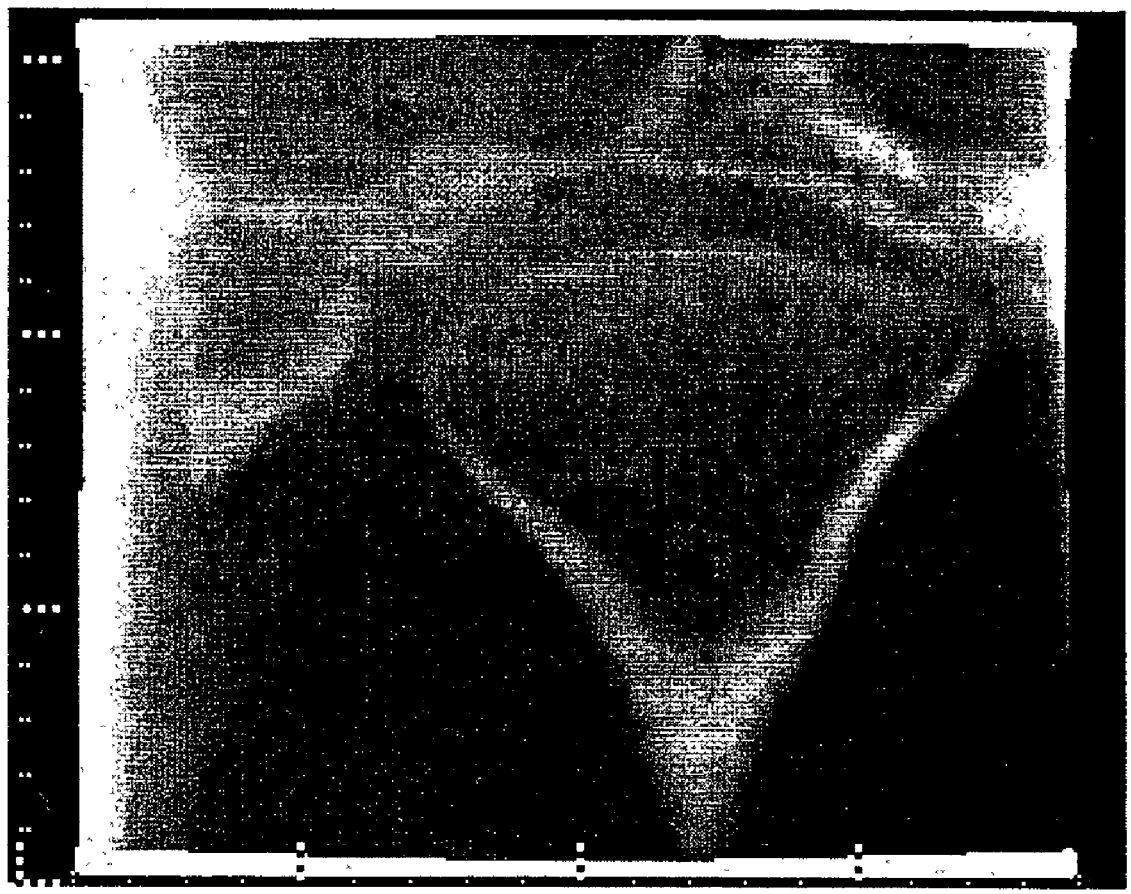
FIG. 6 is a photograph that shows the image obtained by performing the averaging process on the temporomandibular joint image showed in FIG. 3.

FIG. 6 is a figure showing the averaged picture of the temporomandibular joint image shown in FIG. 5.

Since noise is random, the noise approaches a certain value when it is added to each other. As showed in FIG. 6, one may notice that the noise is reduced by averaging processing.

As described above, one can reduce the noise by only the averaging processing, even without any special image processing technique. In this embodiment, the next combination of eight screens for averaging processing is shifted by one screen from the preceding combination of eight screens, but one can select the next combination of eight screens next to the preceding combination of eight screens as shown in FIG. 5(B). Additionally, the number of screens that are averaged is not limited to eight. Furthermore, averaging is not limited to a simple mean, but can be another statistical process that can reproduce images without distortion. For example, one can use an arithmetic mean depending on the characteristics of the noise.

Next, emphasizing processing in compliance with the histogram emphasis method of step S2 is executed.

The histogram emphasis method emphasizes only the histograms in the gray level between a–b by applying the following expression (1) to an image.

$$Y = 255 * (X-a)/(b-a) \qquad (1)$$

In this embodiment, some density ranges are emphasized first. For example, a gray scale range (a, b) that includes a large portion of the outline of temporomandibular joint, and then, the gray scale range a–b is remapped to the gray scale range 0–255, and accordingly partial emphasis is made.

In addition, the details of the histogram emphasis method are described in "Introduction to image processing by C language, Shoko-Do, 2000".

In consideration of histograms of the gray level of an image, an image suitable for binary coding generally has 2 peaks. That is, the image suitable for binary coding is an image such that, when binary coded, an object and a non-object form respective peaks, of which difference is clear. This situation is desirable.

Histogram emphasizing will be described in more detail as follows.

Figure 7:
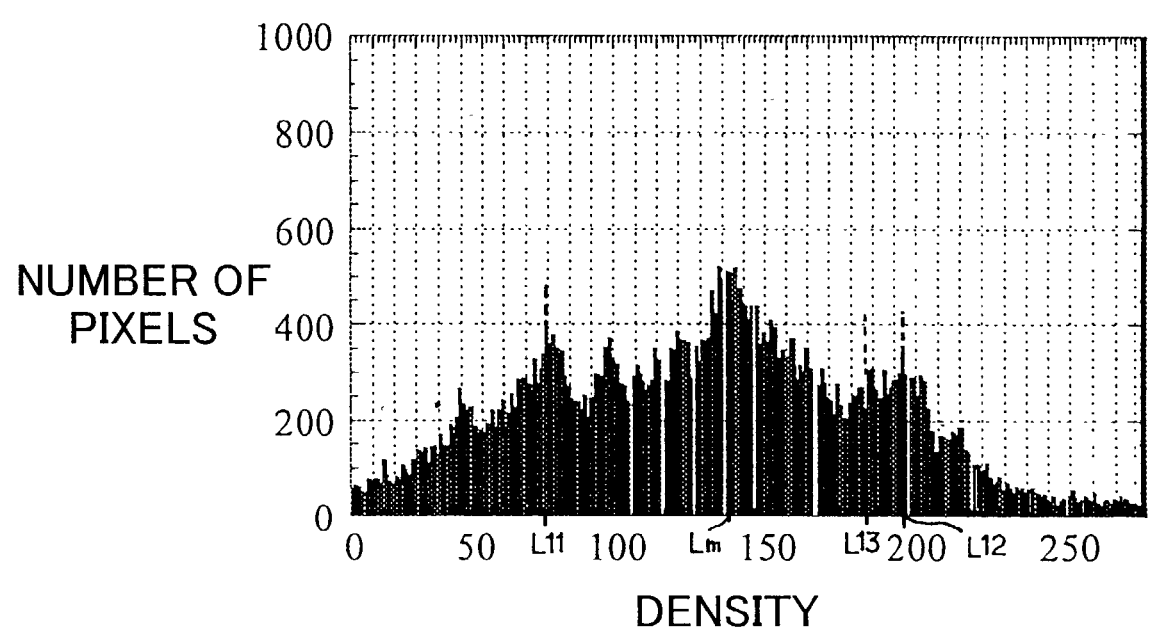
FIG. 7 is a histogram of a temporomandibular joint image.

FIG. 7 is a histogram of gray levels of a temporomandibular joint image. Histogram emphasis processing reduces influence of noise components by removing gray level ranges that do not include the gray level of the temporomandibular joint that is an object (the range that mainly includes noise components and does not include many components of temporomandibular joint) and remapping the other gray level range to the original range.

In a temporomandibular joint image shown in FIG. 7, as the result of trial and error, it is known that the gray level range less than 100, for example, does not include much information of the temporomandibular joint. Therefore, the histogram emphasis processing reduces noise by eliminating the gray level range less than 100 and remapping the remaining range 100–255 to the original range to emphasize the gray level range 100–255, and creates images with reduced effect of noise.

In addition, even if the histogram emphasis processing cuts a portion of uncertain data, the cut causes no problem in forming a 3-dimensional image of temporomandibular joint. In other words, since the present invention treats a lot of temporomandibular joint images and, even if the present invention cuts a portion of uncertain data, temporomandibular joint images of the other angles indicate the portion clearly, and there is no problem in forming the temporomandibular joint image. For example, since an unclear region that is located at the edge of a certain image is, in the case of another image of a different angle, located at the center, ignoring the unclear data at the edge position causes no problem.

Figure 8:
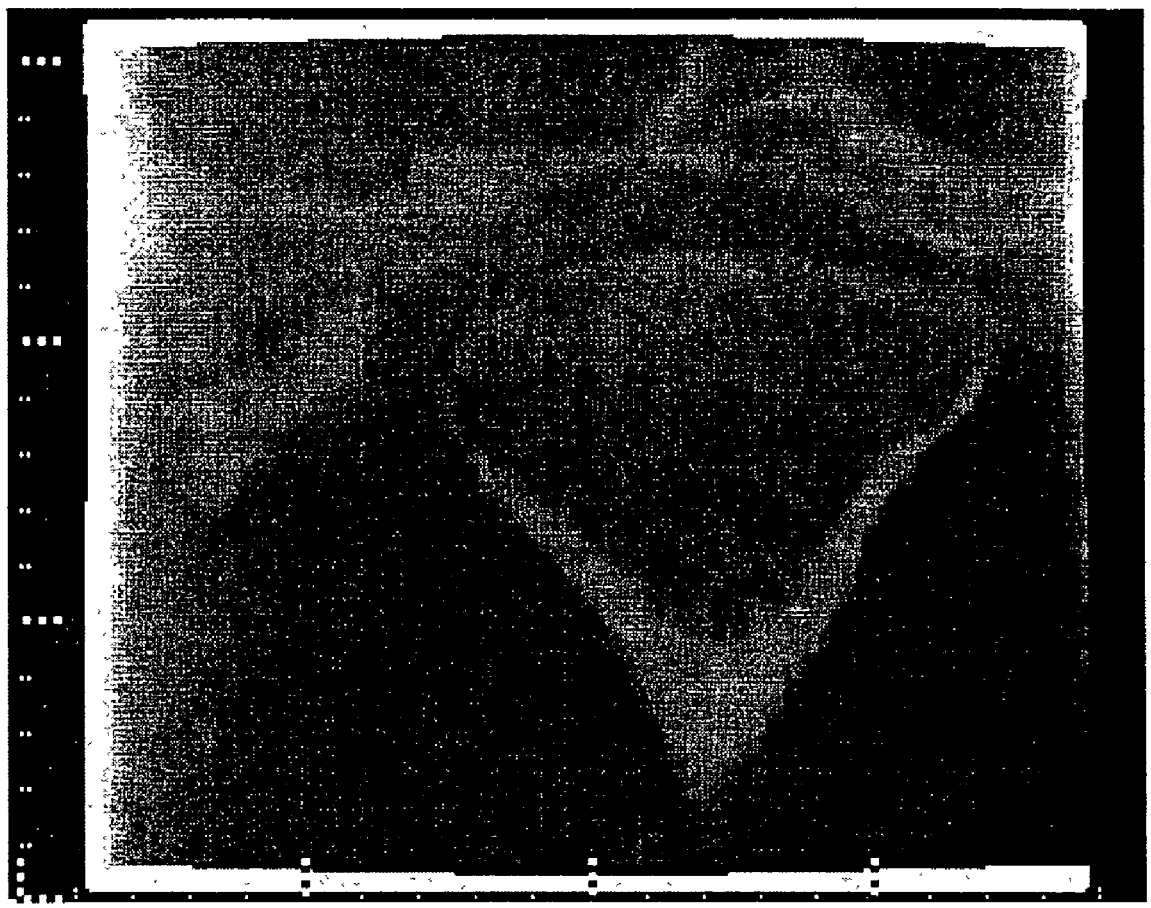
FIG. 8 is a photograph that shows a temporomandibular joint image having a histogram characteristic of FIG. 7.
Figure 9:
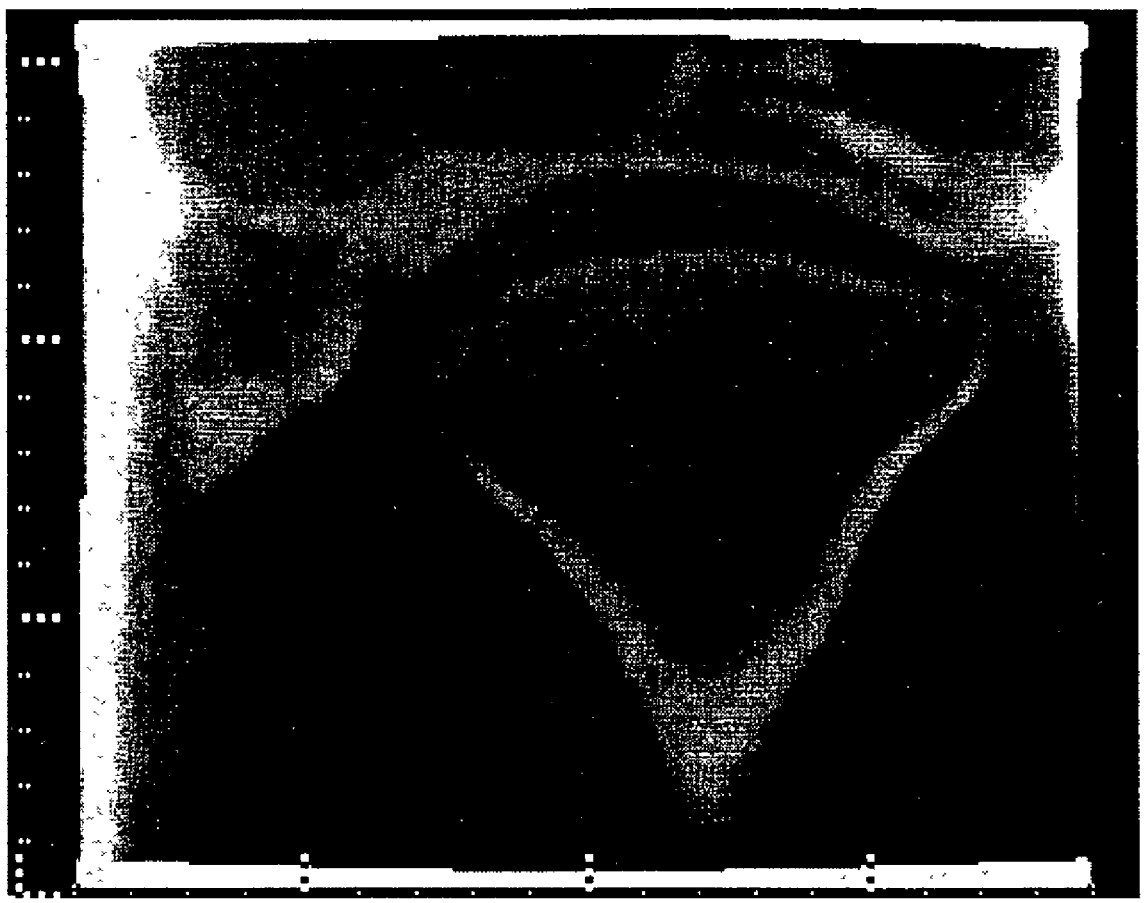
FIG. 9 is a photograph that shows a temporomandibular joint image having a histogram characteristic of FIG. 10.
Figure 10:
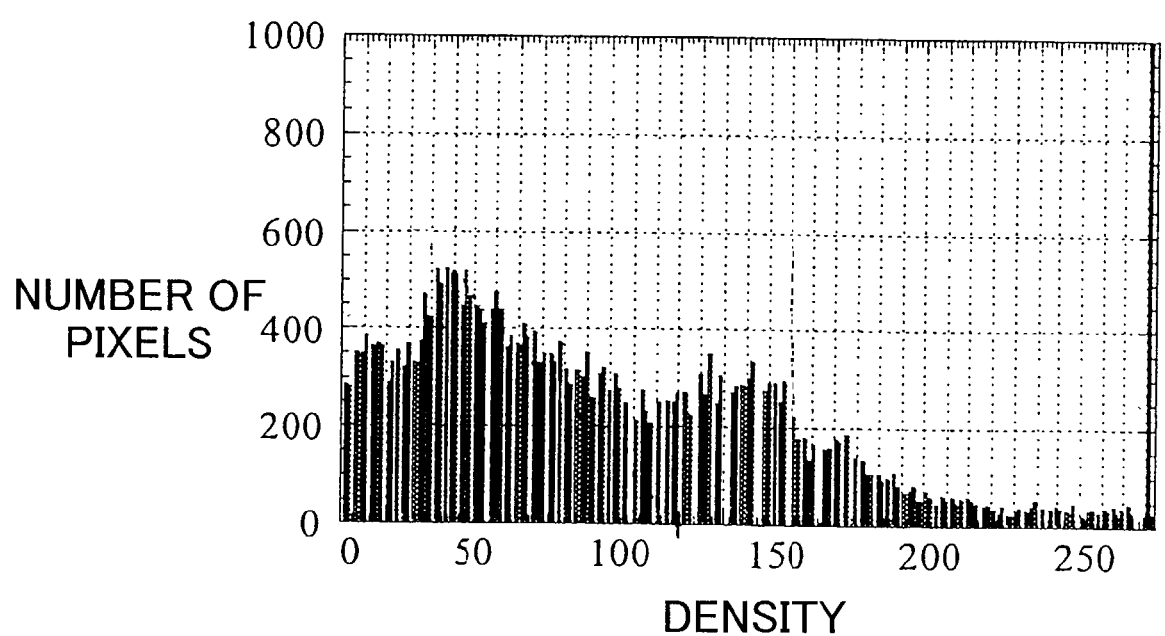
FIG. 10 is a histogram in which gray levels 100–255 showed in FIG. 7 are remapped to gray levels 0–255 according to the first embodiment.

FIG. 8 is an original image of a temporomandibular joint having histogram characteristics shown in FIG. 7; FIG. 9 is a temporomandibular joint image of which gray levels less than 100 are eliminated and gray levels 100–255 are emphasized; and FIG. 10 is a histogram of a temporomandibular joint image of FIG. 9. As to the image after emphasizing shown in FIG. 9, in comparison with the original image shown in FIG. 8, one may notice that the noise component is reduced, and the contrast between the portion of the temporomandibular joint and the background is clear.

In addition, as to mapping, various kinds of methods are considerable. In the gray level histogram shown in FIG. 7, among three peaks, it is supposed that the left peak is the black level, the middle is the background level, and the right is the white level. Thus, since there is no problem for the temporomandibular joint image information even if the background portion in the center does not exist, for example, one can eliminate the background portion in the center and use gray levels near the white level and the black level for emphasizing.

Furthermore, one may perform remapping based on, in the histogram of density shown in FIG. 7, the peak density of a density range that includes a lot of the background components or the peak density of a density range that include a lot of the 3-dimensional object components multiplied by a predetermined coefficient.

Moreover, one may select, from the peripheral density distribution, the density range by which the best image is statistically available as the density range of remapping, and the important thing is to remap in the density range where the influence of noise can be reduced.

Following step 2, in step S3, binary coding processing is performed by the Canny method, for example. The binary coding processing by the Canny method of step S3 will be explained next.

The binary coding processing by the Canny method is binary coding processing that detects an edge by obtaining a local maximum of a gradient of the image.

At first, using 2 thresholds, the binary coding processing detects a strong edge and a weak edge. And, only in the case such that the weak edge is connected to the strong edge, the binary coding processing puts the weak edge in binary form by including the weak edge in an output edge. In addition, the details of the Canny method are indicated in "CANNY, A Computational Approach to Edge Detection, IEEE TRANSACTION ON PATTERN ANALYSIS AND MACHINE INTELLIGENCE, 1986".

Additionally, depending on an extraction image portion, one may set the threshold at an appropriate value at which the best image is empirically obtained. Furthermore, binary coding processing is not limited to the Canny method, and one can binary code using another binary coding method.

Figure 11:
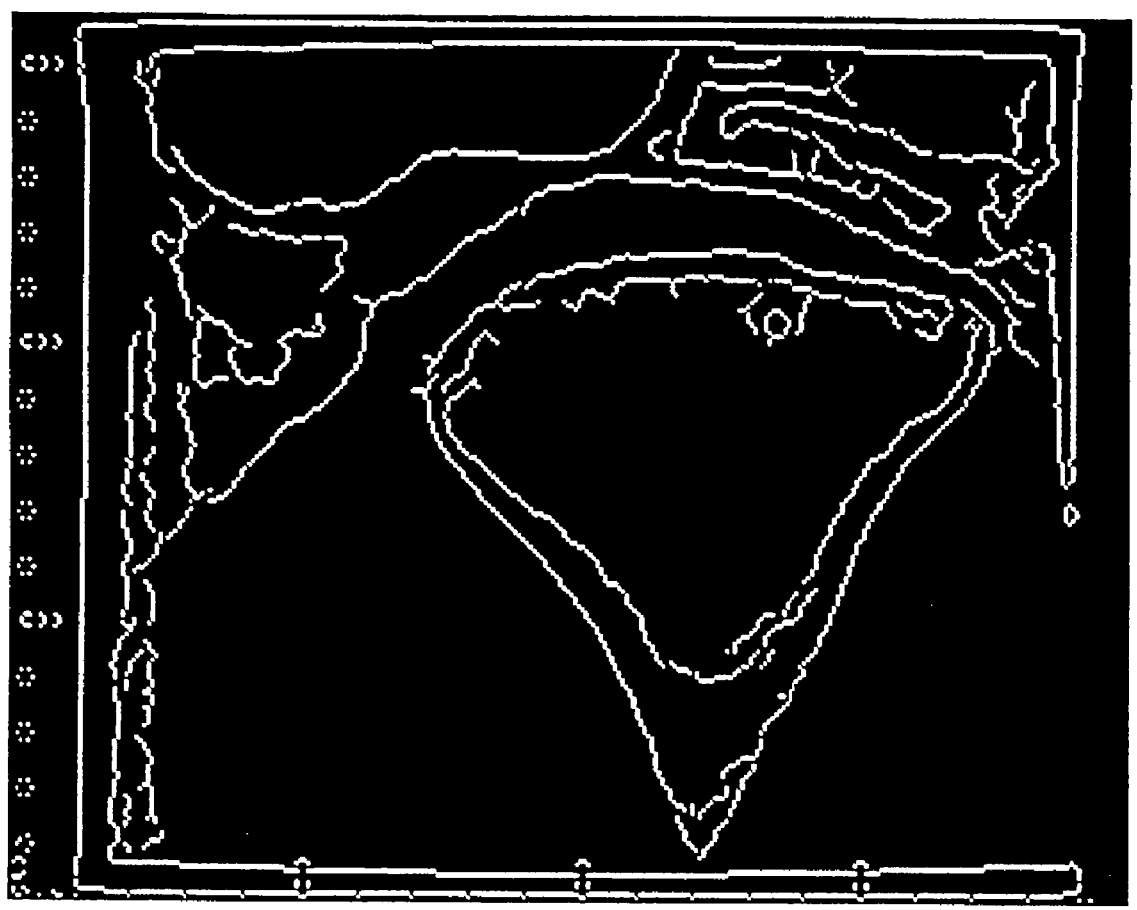
FIG. 11 is a binary coded image after partial emphasizing according to the first embodiment.
Figure 12:
FIG. 12 is a binary coded image of the original picture image according to the first embodiment.

Additionally, the emphasized image shown in FIG. 9 is binary coded by the Canny method, which is the binary coded image shown in FIG. 11, and the original image showed in FIG. 6 is binary coded "as is" by the Canny method, which is the binary coded image showed in FIG. 12. According to these binary coded images, in the binary coded image showed in FIG. 11, in comparison with the binary coded image shown in FIG. 12, it is evident that noise is reduced. Even in FIG. 12, the outline of the temporomandibular joint appears, but, it is evident that the image is noisier. This indicates that, in the histogram of the original image shown in FIG. 7, there exist a plurality of mountains, and the noise component is not concentrated on a certain gray level, but is distributed in the gray levels 100–255 too.

In this embodiment, by mapping the gray levels 100–255 in the gray level 0–255 by the histogram emphasizing method, one can scatter the noise component existing in the gray level 100–255, and reduce the frequency of detecting a noise having a small gradient as an edge in the case of binary coding by the Canny method, and, as a result, one can further reduce the noise component.

As described above, one can effectively reduce noise by binary coding the image by the Canny method after performing the histogram emphasis method.

As described above, one can obtain a clear 3-dimensional image by forming the 3-dimensional image using binary coded 2-dimensional images. In addition, a 3-dimensional image can be formed, using the opposite algorithm for the cutting of an image, for example.

Figure 13:
FIG. 13 is a photograph that shows the 3-dimensional image which is formed based on the image provided by image processing according to the first embodiment.
Figure 13:
Figure 13:
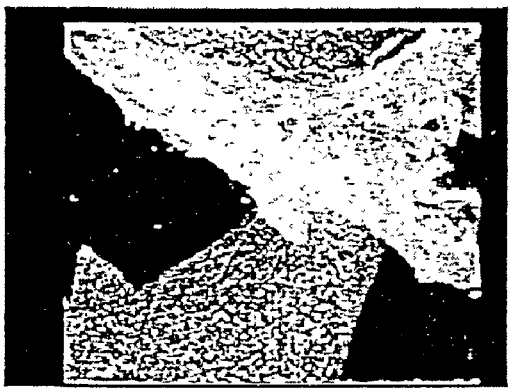
Figure 13:

In FIG. 13 is the 3-dimensional image formed based on an image provided by the above image processing.

According to the present embodiment, it is possible to obtain a clear 3-dimensional image from noisy 2-dimensional images taken with a small amount of radiation exposure. In this embodiment, a plurality of images processed by averaging processing are processed by the histogram emphasizing method and binary coded, so that one can lower the influence of noise and detect an edge without performing complicated processing. That is how one can minimize the influence of noise.

In addition, in this embodiment, the same processing is performed on 4,416 2-dimensional images, but it is possible to apply, depending on the extracted portion, averaging processing and binary coding processing that are most suitable for the portion. For example, one may obtain extraction results with varying thresholds and switching thresholds, depending on the portion of images by setting a threshold for each portion with which the best image is obtained.

Moreover, in this embodiment, an example wherein the present invention is applied to the temporomandibular joint is explained, but the image processing according to the present invention is not limited to the temporomandibular joint, but applicable to an imaging object that requires imaging with little radiation due to a problem of radiation exposure.

Moreover, the image processing method according to this embodiment cuts images of various angles around the Z-axis, and performs interpolation on edges that cannot be obtained in a direction.

It is also possible to cut images of various angles around the X-axis or Y-axis instead of the Z-axis.

Moreover, it is possible to cut images around:

(i) X-axis and Y-axis that are rotated by 45 degrees around the origin in the XY plane;

(ii) Y-axis and Z-axis that are rotated by 45 degrees around the origin in the YZ plane; and (iii) Z-axis and X-axis that are rotated by 45 degrees around the origin in the ZX plane.

Moreover, it is possible to cut images in various angles around a plurality of axes.

THE SECOND EMBODIMENT

Figure 14:
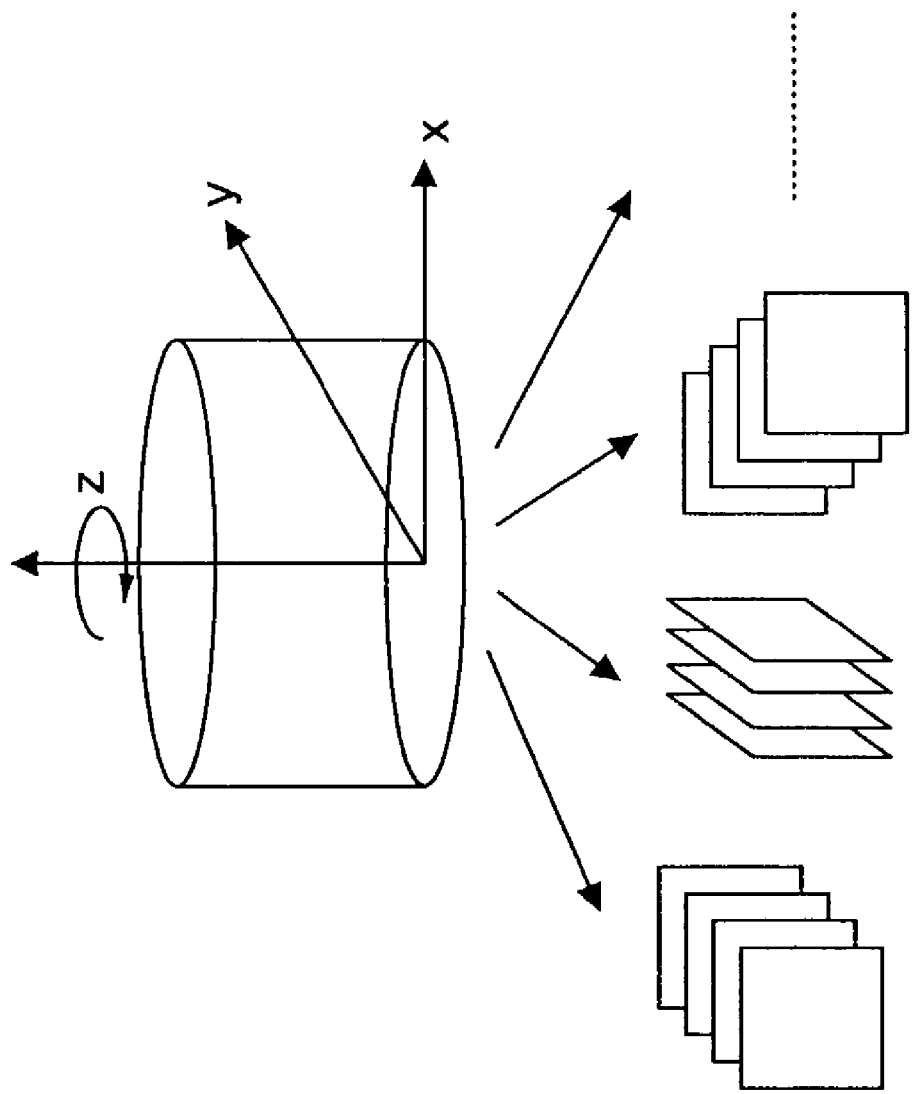
FIG. 14 is a figure for explaining the angle of images about the 3 axes X, Y, and Z.

By the way, as to the image processing method described above, as showed in FIG. 14, since the image processing is applied to many images taken in various directions around the Z-axis, for example, there exists a problem that the image processing takes a long time.

For example, when the present inventors measured the time required for processing in the case of 4,416 images in total, that is, 276 images per direction, 16 directions, using a computer operated at 800 MHz and having 256 MB RAM memory, for example, it took 15 minutes for cutting images, 35 minutes for image processing and forming, and 5 minutes for displaying in 3-dimension, in total 55 minutes. It is said that the maximum time that can be spent for clinical application is about 10 minutes, and the use of the image processing method is not practical.

Figure 15:
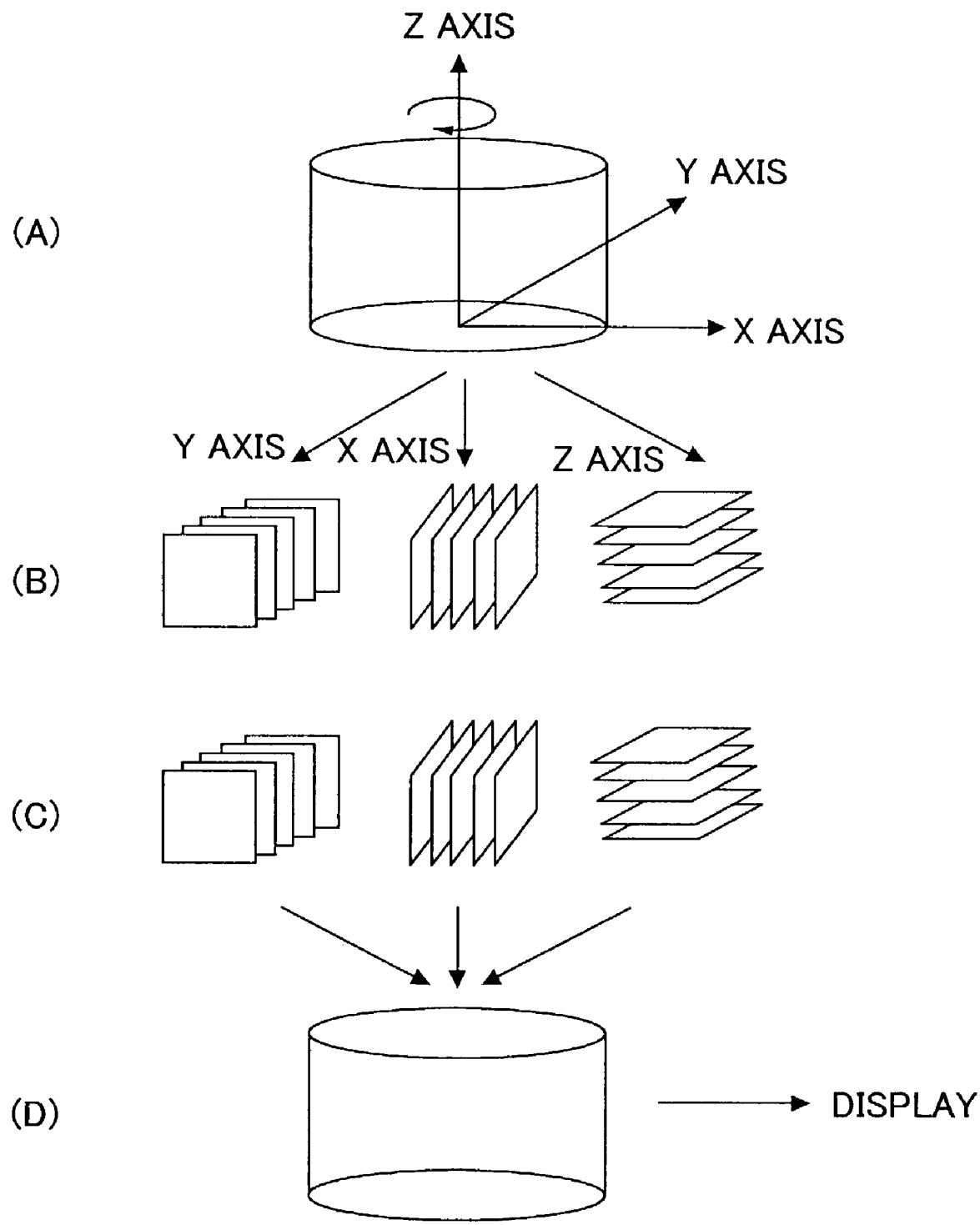
FIG. 15 is a diagram for explaining the processing procedure according to the second embodiment.

Therefore, in the embodiment described above, processing in various directions around one axis is performed 3-dimensionally, but in the second embodiment as shown in FIG. 15, 2-dimensional images (B) in each direction of X-axis, Y-axis, and Z-axis, 3 directions in total, are cut from 3-dimensional data (A) provided by means of the imaging apparatus. The 2-dimensional images that are cut are processed by the averaging processing, histogram emphasizing, and binary coding processing (C) as shown in FIG. 4. Using these 2-dimensional images provided, 3-dimensional images are formed and stored in the internal memory (D). The 3-dimensional image stored in the internal memory is displayed. In addition, in this embodiment, besides the cutting of an image, the image processing method according to the first embodiment described above can be used.

In addition, as to the above embodiment, the case such that images are cut from 3 directions of X-, Y- and Z-axes is described, but even a case other than this can be embodied.

For example, one may add a part or all of the following axes to X-, Y-, and Z-axes described previously:

(i) X-axis and Y-axis rotated 45 degrees in the XY plane around the origin;

(ii) Y-axis and Z-axis rotated 45 degrees in the YZ plane around the origin; and (iii) Z-axis and X-axis rotated 45 degrees in the ZX plane around the origin and X-axis.

Figure 16:
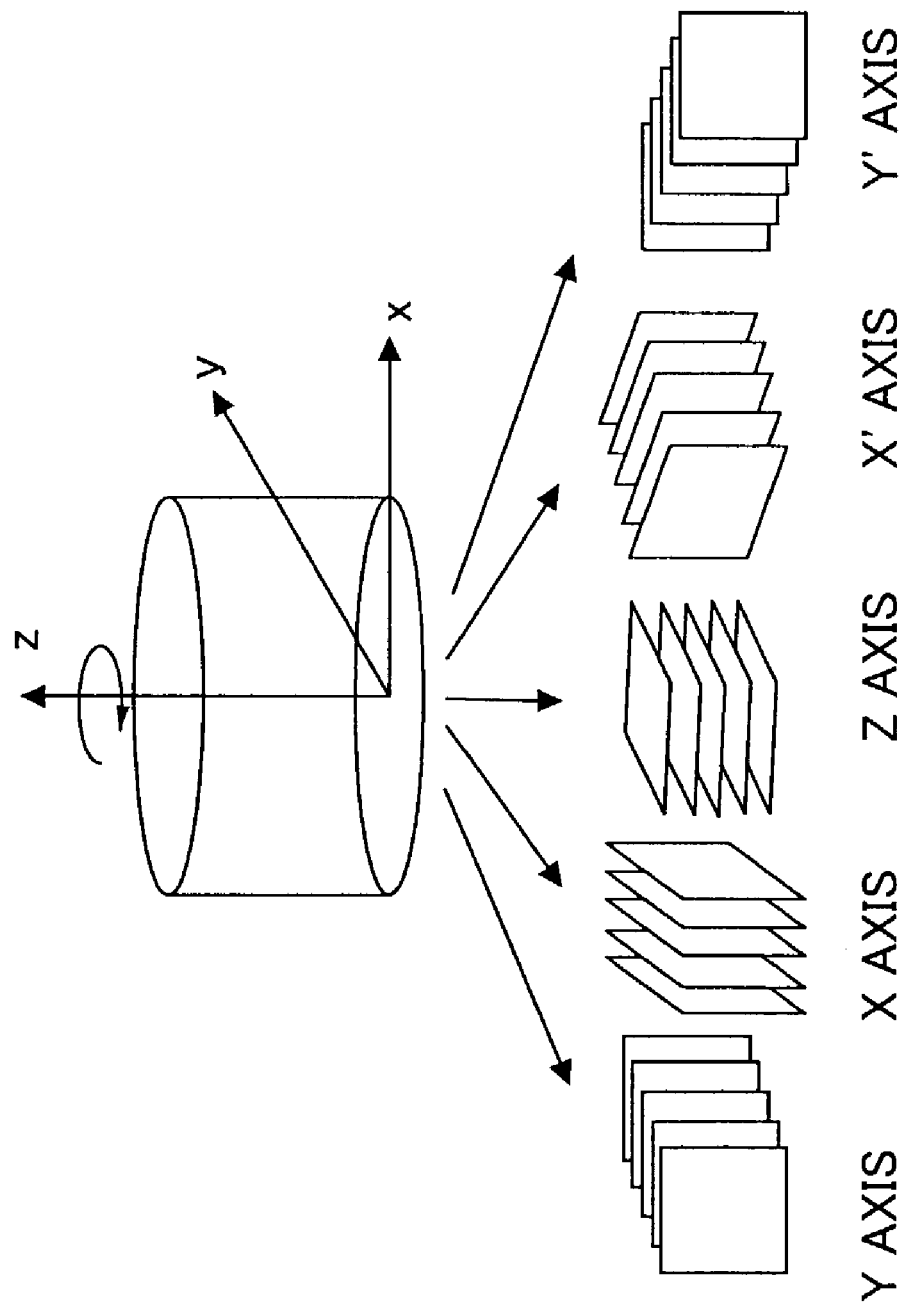
FIG. 16 is a diagram for explaining the angle of images about the five axes.

For example, in FIG. 16, an example such that images are cut in the directions of five axes consisting of X' axis and Y' axis that are rotated by 45 degrees in the XY plane in addition to X-, Y- and Z-axes.

Figure 17:
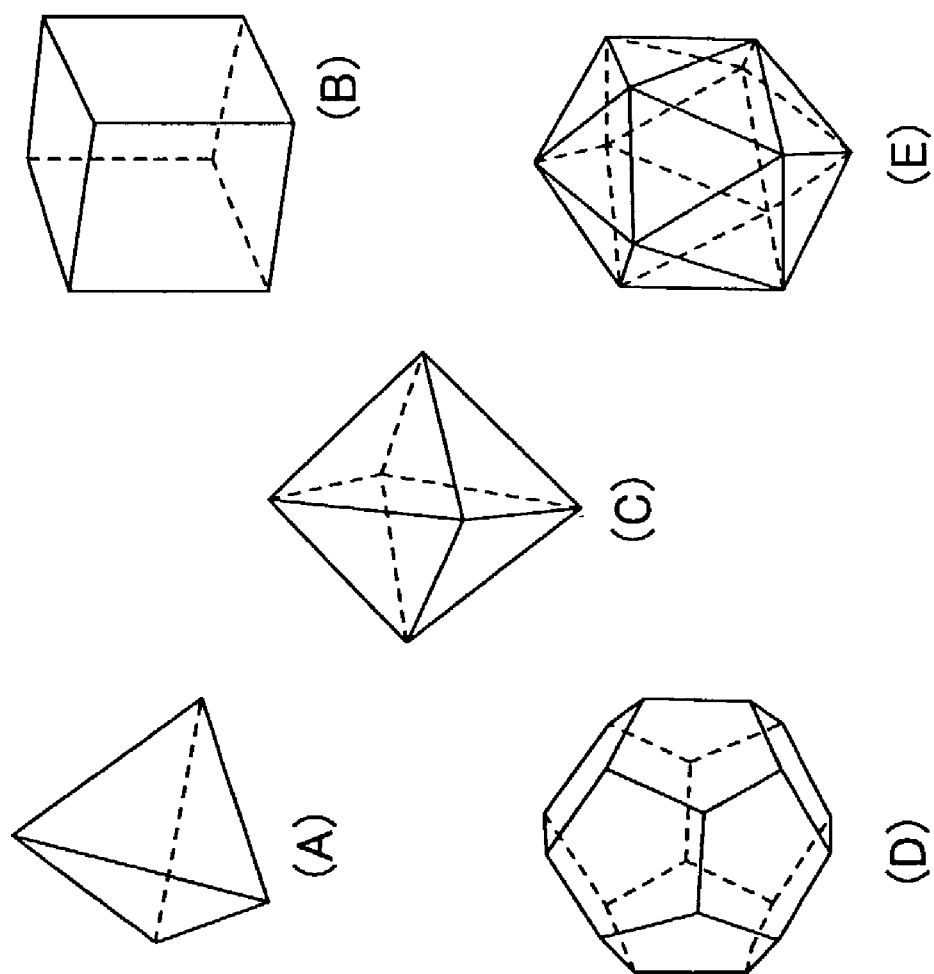
FIG. 17 shows regular polyhedrons.

Moreover, it is possible to use, as an axis, a part or all of the lines connecting the center of each face of regular polyhedrons and the center of the regular polyhedrons, regular tetrahedron (A), regular hexahedron (B), regular octahedron (C), regular dodecahedron (D), and regular icosahedron (E), as showed in FIG. 17.

Figure 18:
FIG. 18 is a photograph that shows the 3-dimensional image that is obtained by conventional image processing.
Figure 19:
FIG. 19 is a photograph that shows the 3-dimensional image that is obtained by the first embodiment.
Figure 20:
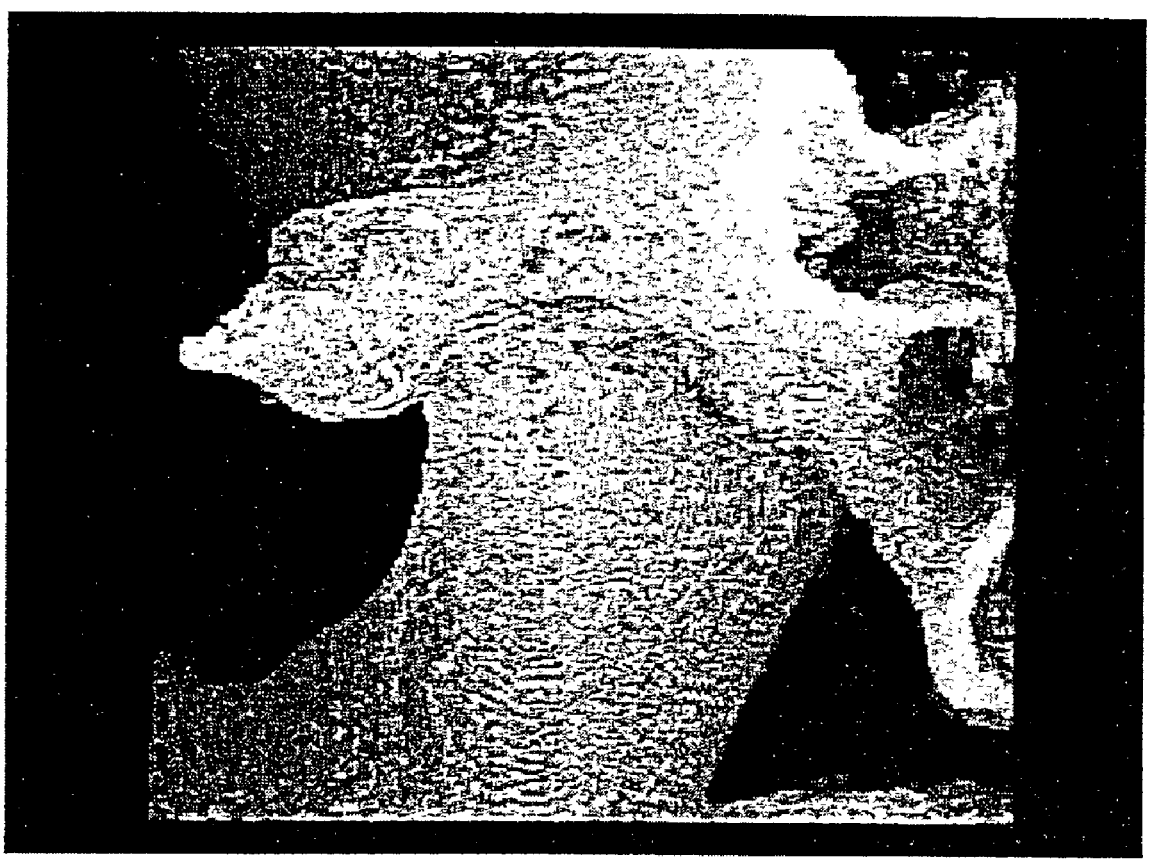
FIG. 20 is a photograph that shows the 3-dimensional image that is obtained by image processing in 3 directions according to the second embodiment.

A 3-dimensional image processed in 3 directions actually using the method showed in FIG. 15 is showed in FIG. 20. A 3-dimensional image obtained by a conventional method is showed in FIG. 18, and a 3-dimensional image obtained by the method of the first embodiment is showed in FIG. 19. The 3-dimensional image showed in FIG. 20, in comparison with the 3-dimensional image showed in FIG. 19, is a 3-dimensional image in which some noises are observable but the shape of the object is recognizable. Moreover, the 3-dimensional image showed in FIG. 20, in comparison with the 3-dimensional image showed in FIG. 18, is a 3-dimensional image in which no deficit exists and the shape of the object is recognizable. This situation is understandable.

Moreover, as to processing time, the method of the second embodiment took about 14 minutes from the reading of 3-dimensional projection data to the completion of a file making. In comparison with that it takes about 55 minutes in the case of the conventional 16-direction processing, so a 3-dimensional image can be obtained in about one forth of the time with the second embodiment.

As described above, as to the image showed in FIG. 20, in comparison with the 3-dimensional image of 16 directions, a portion that is inferior to the 3-dimensional image of 16 directions is more or less observable, but the 3-dimensional image obtained by image processing in 3 directions is considered to be effective in consideration of computation time, as long as the objective is grasping shapes.

As described above, as to the first and the second embodiments, since many images are obtained by extracting them, in a plurality of angles or around one or more axes, from a plurality of images having different depths of a 3-dimensional object, it is possible to surely obtain an image of the imaging object even if a density range containing a few components ob the 3-dimensional object is eliminated, and, since noise components can be diffused by eliminating the density ranges containing a few components of the 3-dimensional object, remapping the other portion to a predetermined density range, and binary coding the first and the second embodiments are characterized in that, for example, images having less influence of noise are obtainable.

Moreover, the first and the second embodiments are characterized in that, for example, images having less influence of noise can be obtained since they can reduce noise components without damaging the accuracy of images by extracting averaged images from the average of a predetermined number of images consecutive in the direction of depth.

Moreover, the first and the second embodiments are characterized in that they can obtain images having less influence of noise since they can reduce noise components without losing the accuracy of images by averaging and extracting images while shifting by one image in the direction of depth for averaging.

Moreover, the present invention can perform image processing at a high speed by averaging a plurality of images and extracting one image by the plurality of images, and then, the present invention is characterized in that, for example, it can reduce the loss in accuracy by treating many images that are imaged.

Moreover, the first and the second embodiments, in the case of mapping, can reduce noise without including noise components and surely extract images of the 3-dimensional object by selecting, as a threshold, a density in the density distribution containing great noise components in the histogram of density level of the images of the 3-dimensional object, at which the noise component is negligible.

Moreover, the first and the second embodiments can surely extract the density component containing the background components or the 3-dimensional object components by performing remapping based on the peak density of the density range containing the background components or the peak density of the density range containing the 3-dimensional object components, both multiplied by a predetermined coefficient.

Moreover, the first and the second embodiments are characterized in that they can provide the most suitable image for forming a 3-dimensional image since a threshold with which the statistically optimum image is obtained is selected.

Moreover, it is possible that, in the general purpose computer 14 showed in FIG. 1, a computer program that causes the general purpose computer 14 to perform an extraction step to extract a plurality of images having different depths of a 3-dimensional object around one or more axes over a plurality of angles, a binary coding step that eliminates the density range of the plurality of images obtained in the extraction step, in which few components of the object are contained, and remaps the other portion to a certain density range, and puts the image in a binary form, and a step to form a 3-dimensional image of the 3-dimensional object based on the images put in binary form in the binary coding step, and image processing according to the first and second embodiments can be performed by this program.

In addition, needless to say, the present invention is not limited to the above embodiments and, without deviating from the scope of claims, various variations and modifications are possible.

The invention claimed is:

1. An image processing method, comprising:

extracting a plurality of images from 3-dimensional data of a 3-dimensional object along one or more axes at different depths, said axes forming an angle with each other;

eliminating a gray level range including at least two components of said 3-dimensional object from the plurality of images extracted, and remapping remaining gray level range to a predetermined gray level range, thereby forming a plurality of binary images; and forming a 3-dimensional image of said 3-dimensional object based on the plurality of binary images.

2. An image processing method comprising:

extracting, from 3-dimensional data of a 3-dimensional object, a plurality of images along a plurality of axes, wherein each axis is in a different direction and each image is at a different depth on an axis;

eliminating a gray level range including at least two components of said 3-dimensional object from the plurality of images extracted in said extracting, and remapping remaining gray level range to a predetermined gray level range, thereby forming a plurality of binary images; and forming a 3-dimensional image of said 3-dimensional object based on the plurality of binary images formed in said binary coding.

3. The image processing method claimed in claim 1, wherein the eliminating and remapping further comprise:

averaging subsets of the plurality of images to form average images, the subsets including a predetermined number of successive images along one of the at least one axes.

4. The image processing method as claimed in claim 3, wherein the averaging is performed for a particular subset to form one of the average images, and then for a next subset including a next one of the plurality of images that was not yet included in the particular subset, and excluding the last one of the plurality of images that has already included in the particular subset.

5. The image processing method as claimed in claim 3, wherein the averaging is performed for a particular subset to form one of the average images, and subsequently is performed for a next subset ahead of the particular subset by a predetermined number of images.

6. The image processing method as claimed in claim 1, wherein the eliminating and remapping further comprise:

remapping, in a gray level histogram of the 3-dimensional object including great noise component, a gray level range including negligible noise component to thereby form a plurality of binary images.

7. The image processing method as claimed in claim 1, wherein in the eliminating and remapping, the remapping is performed based on a peak gray level multiplied by a predetermined coefficient in a gray level histogram of the 3-dimensional object including a substantial background component, or in a gray level histogram of the 3-dimensional object including a substantial component of the 3-dimensional object.

8. The image processing method as claimed in claim 1, wherein the eliminating and remapping further comprise:

statistically remapping on the basis gray level distribution of peripheral pixels.

9. A computer readable recording medium storing an image processing program that causes a computer, when executed by the computer, to perform:

extracting a plurality of images from 3-dimensional data of a 3-dimensional object along one or more axes at different depths, said axes forming an angle with each other;

eliminating a gray level range including at least two components of said 3-dimensional object from the plurality of images extracted, and remapping remaining gray scale range to a predetermined gray level range, thereby forming a plurality of binary images; and forming a 3-dimensional image of said 3-dimensional object based on the plurality of binary images.

* * * * *